Patented Feb. 19, 1952

2,586,661

UNITED STATES PATENT OFFICE 2,586,661

PROCESS FOR THE RESOLUTION OF AN AMINO-DIOL RACEMATE

Robert Michel Jacob, Ablon-sur-Seine, Leonide Liakhoff, Vitry-sur-Seine, and Jacques Georges Robert, Paris, France, assignors to Societe des Usines Chimiques Rhone-Poulenc No Drawing. Application December 6, 1950, Serial No. 199,548. In France December 14, 1949

4 Claims. (Cl. 260—562)

This invention relates to a process for the resolution of an amino-diol racemate and in particular is concerned with the resolution into its optically active isomers of racemic threo 1-para-nitrophenyl - 2 - dichloroacetylamino - propane 1:3-diol (commonly known as racemic chloramphenicol).

As is well known, only one of the optically active isomers of this compound has useful therapeutic properties, namely that which is dextrorotatory in ethanol solution and which is identical with the so-called "natural" product obtained by the fermentative growth of Streptomyces venezuelae.

The problem of resolving racemic chloramphenicol is fraught with difficulties not only because the compound is a glycol but also because of the presence of the dichloroacetylamino group which is readily hydrolysed in an acid medium and which, moreover, is sensitive to alkalis.

According to the present invention, a process for the resolution of racemic chloramphenicol comprises forming the monosuccinyl derivative and treating the same with strychnine. The monosuccinyl derivative has the formula:

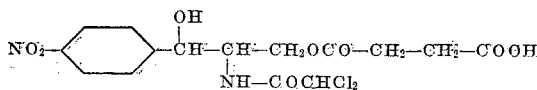

In this way, a mixture of isomeric strychnine salts are obtained which possess different solubility characteristics and can therefore be separated by fractional crystallisation. Thus, in organic solvents, such as acetone or n-propyl alcohol or mixtures thereof with chloroform, the strychnine salt corresponding to the optical isomer identical with natural chloramphenicol is sufficiently more soluble than the isomer or a racemic mixture of the two to render separation by dissolution or formation of the racemic mixture of strychnine salts in such a solvent, a relatively simple matter.

The result of the process of the present invention is unexpected and contrary to expectations deriving from the chemical literature. Thus, while a preferred method of resolving optically active alcohols has usually involved the formation of an acid ester (phthalic, succinic or the like) it has heretofore been considered that such method is not applicable to glycols (Ingersoll "The resolution of alcohols"—Organic Reactions vol. II p. 386) and certainly this known observation appears to apply in the case of chloramphenicol when phthalic acid is used.

It is a simple matter to convert the strychnine salt of each of the isomers to the monosuccinyl derivative of the corresponding optically active chloramphenicol by known methods e. g. by basification followed by neutralisation. The corresponding chloramphenicol is obtained in a particularly advantageous manner from the monosuccinyl derivative by alkaline hydrolysis in aqueous medium at low temperature (conveniently about 0° C.). This hydrolysis is facilitated by the solubility in water of the alkali metal salt of monosuccinyl chloramphenicol and the relative insolubility of chloramphenicol, which therefore precipitates as it is formed.

The crude product obtained from the more soluble strychnine salt consists predominantly of the chloramphenicol isomer identical to the natural product, as can be demonstrated on measurement of its rotatory power on polarised light or on comparison of its antibiotic activity with that of natural chloramphenicol. Additional purification of the strychnine salt of the monosuccinyl derivative gives a pure product, but purification at that stage is not necessary becaues it is equally advantageous to re-crystallise the crude optically active chloramphenicol from a normal solvent (preferably ethyl acetate). The racemic product least soluble in these solvents precipitates first and can thus be eliminated. Any traces of optical antipode can then be removed by treating the mother liquors with a mixture of ethyl acetate and petroleum ether when the required isomer only crystallises.

In order to obtain the mono-succinyl derivative starting material in good yield it is preferred to dissolve substantially equimolecular quantities of racemic chloramphenicol and succinic anhydride in a mutual non-hydroxylic solvent such as dioxane, to heat the solution (a temperature of 70°–75° C. is satisfactory), when an organic base such as pyridine, preferably as a solution in the said solvent, is added, heating being continued until completion of the reaction, to basify the reaction mixture to remove unreacted chloramphenicol and to neutralise the resulting solution.

The present invention is illustrated by the following examples.

Example I 2.115 g. of acid monosuccinyl derivative of racemic threo chloramphenicol are dissolved in 30 cc. of acetone, and 1.67 g. of strychnine are dissolved in 11 cc. of chloroform. The two solutions are mixed and left for two days in a refrigerator at about 0° C. The strychnine salt which has crystallised, of a dry weight of 2.1 g. is filtered off. The filtrate is evaporated under reduced pressure and at room temperature. The residue is taken up with 20 cc. of chloroform, whereafter 22.2 cc.

of deci-normal caustic soda solution are gradually added with vigorous stirring. The aqueous solution is decanted and rendered just acid to Congo red by the addition of dilute sulphuric acid. A monosuccinyl chloramphenicol derivative precipitates, and is filtered, washed with water and then dried in vacuo over sulphuric acid. The crude product thus obtained, namely 0.580 g., melts at about 120° (capillary tube) and has a rotatory power $[\alpha]_D^{18}$ ($c=11.2\%$ in ethanol) $=+18.7°$ (The corresponding product prepared from natural chloramphenicol melts at 125°–127° C. and has a rotatory power.

$[\alpha]_D^{18}$ ($c=10\%$ in ethanol) $=+25°$)

This 0.580 g. of crude product is taken up in 5.5 cc. of demi-normal caustic soda solution, dissolution taking place immediately. The solution is left for one hour at about 0° C. Chloramphenicol precipitates gradually, and is extracted by means of a mixture of ether with 20% of ethyl acetate. On evaporation of the solvent mixture, 0.270 g. of crude chloramphenicol is obtained, which has a melting point (capillary) of 143° C. and a rotatory power $[\alpha]_D^{18}$ ($c=4.9\%$ in ethanol) equal to $+17.1°$ Its activity on Klebsiella pneumoniae and on Escherichia Coli in vitro is substantially equal to that of the natural product. Natural chloramphenicol has a rotatory power $[\alpha]_D^{18}$ ($c=11.4\%$ in ethanol) $=+20.2°$ The monosuccinyl derivative of racemic threo chloramphenicol is prepared in the following manner: a mixture of 5 g. of racemic threo chloramphenicol and 1.6 g. of succinic anhydride is dissolved in 10 cc. of anhydrous dioxane. The mixture is heated to 70–75° C. and a solution of 1.22 g. of anhydrous pyridine in 5 cc. of dioxane is introduced drop-by-drop at this temperature over a period of half-an-hour. The mixture is maintained at about 70°–75° C. for a further half-hour, whereafter the solvent is evaporated under reduced pressure. The oily residue is taken up in 10 cc. of water and 1.5 g. of sodium bicarbonate. The mixture is allowed to settle and the unreacted chloramphenicol which crystallises is filtered off. The filtrate is acidified until it is just acid to Congo red. The acid derivative precipitates, whereafter it is filtered off, washed first with water and then with anaesthetic ether. 4.6 g. of dry product having a melting point (capillary) of 152°–160° C. are obtained. The product obtained by crystallisation from 50% aqueous methanol has a melting point (capillary) of 163° C.

Example II

A mixture of 1.5 g. of strychnine and 1.9 g. of acid monosuccinyl derivative of racemic threo chloramphenicol are dissolved in 25 cc. of normal propyl alcohol with heating at about 50° C. The mixture is allowed to stand and the strychnine salt which crystallises is filtered off. It is collected and dried in a desiccator and 1.40 g. of crude salt having a melting point (capillary) of 152° C. (with decomposition) are obtained. On recrystallisation from 40 cc. of isopropyl alcohol, 0.75 g. of salt having a melting point (capillary) of 154° C. is obtained. When treated as in Example I, this product gives a monosuccinyl derivative of chloramphenicol which has a melting point (capillary) of 125°–127° C., the hydrolysis of which gives the optical antipode of the chloramphenicol isolated in Example I.

Example III

By proceeding as in Example I, but with 13 cc. of acetone instead of 30 cc., 1.74 g. of a substantially insoluble strychnine salt melting at about 145°–150° C. (capillary) is obtained. From the filtrate, 0.4 g. of a crude threo chloramphenicol having a rotatory power $[\alpha]_D^{18}$($c=4.9\%$ in ethanol) of $+9.4°$ can be extracted by the method of Example I.

0.24 g. of this crude threo chloramphenicol are dissolved in 2 cc. of boiling ethyl acetate. 0.5 cc. of petroleum ether is added and the mixture is allowed to crystallise. A chloramphenicol inactive to polarised light is filtered off. On evaporation of the filtrate, 0.10 g. of chloramphenicol having a rotatory power $[\alpha]_D^{18}$ ($c=2.5\%$ ethanol) $=+17.6°$ is obtained.

Example IV 2.115 g. of acid monosuccinyl derivative of racemic threo chloramphenicol are dissolved in 23 cc. of isopropyl alcohol, and 1.67 g. of strychnine are dissolved in 11 cc. of chloroform. The two solutions are mixed, whereafter the solvents are evaporated under reduced pressure at room temperature. The residue is taken up in 30 cc. of acetone heated at about 50° C. Complete dissolution occours. The product is allowed to crystallise for two days at about 0° C. in a refrigerator. The strychnine salt which has crystallised, of a dry weight of 2.3 g., is filtered off. On evaporation of the mother liquors and treatment of the residue as in Example I, 0.250 g. of chloramphenicol having a melting point (capillary) of 143° C. and a rotatory power $[\alpha]_D^{18}$ ($c=4.7\%$ in ethanol) $=+19.9°$ are obtained. When recrystallised from ethyl acetate, it melts at 147°–148° C.

We claim:

1. Process for the production of a therapeutically active optically active isomer of 1-paranitrophenyl - 2 - dichloracetylamino - propane-1:3-diol which is dextro-rotatory in ethanol solution which comprises reacting the monosuccinyl derivative of racemic - 1 - paranitrophenyl - 2 - dichloracetylamino propane-1:3-diol of the formula:

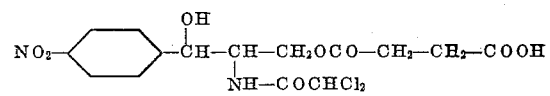

with strychnine, crystallising the resulting mixture from an organic solvent, fractionally separating the more soluble optical isomer contained in the mixture, and subjecting said more soluble isomer to basification, neutralisation and mild hydrolysis.

2. Process for the production of a therapeutically active optically active isomer of 1-paranitrophenyl - 2 - dichloracetylamino propane 1:3 diol which is dextro-rotatory in ethanol solution which comprises reacting the monosuccinyl derivative of racemic-1 - paranitrophenyl - 2 - dichloracetylamino propane-1:3-diol of the formula:

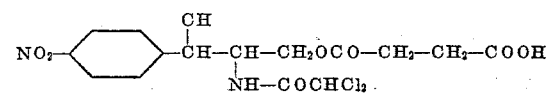

with strychnine, crystallising the resulting mixture from its solution in a solvent medium selected from the group consisting of acetone, n-propyl alcohol and mixtures of either with chloroform, and separating the less soluble optical isomer present, treating the remaining solution with alkali and then with acid and then subjecting the remaining compound to cold alkaline hydrolysis.

3. Process for the production of a therapeutically active optically active isomer of 1-paranitrophenyl - 2 - dichloracetylamino propane-1:3-diol which is dextro-rotatory in ethanol solution which comprises reacting racemic-1-paranitrophenyl - 2 - dichloracetylamino propane-1:3-diol with an equimolecular quantity of succinic anhydride in a neutral non-hydroxylic solvent, heating the solution, adding an organic base, continuing to heat the solution, basifying and neutralising the solution, treating the solution with strychnine, crystallising the resulting mixture from an organic solvent, fractionally separating the more soluble optical isomer contained in the mixture, and subjecting said more soluble isomer to basification, neutralisation and mild hydrolysis.

4. Process for the production of a therapeutically active optically active isomer of 1-paranitro - phenyl - 2 - dichloracetylamino-propane 1:3-diol which is dextro-rotatory in ethanol solution which comprises reacting racemic-1-paranitrophenyl - 2 - dichloracetyl - amino propane 1:3-diol with an equimolecular quantity of succinic anhydride in a neutral non-hydroxylic solvent, heating the solution, adding an organic base, continuing to heat the solution, basifying and neutralising the solution, treating the solution with strychnine, crystallising the resulting mixture from its solution in a solvent medium selected from the group consisting of acetone n-propyl alcohol and mixtures of either with chloroform, and separating the less soluble optical isomer present, treating the remaining solution with alkali and then with acid and then subjecting the remaining compound to cold alkaline hydrolysis.

ROBERT MICHEL JACOB.
LEONIDE LIAKHOFF.
JACQUES GEORGES ROBERT.

REFERENCES CITED

The following references are of record in the file of this patent:

UNITED STATES PATENTS

| Number | Name | Date |
| --- | --- | --- |
| 2,483,885 | Crooks et al. | Oct. 4, 1949 |
| 2,514,376 | Crooks et al. | July 11, 1950 |

OTHER REFERENCES

Karrer: "Organic Chemistry," (1938), pp. 92–93.